United States Patent
Fedorcak (12)

(10) Patent No.: US 6,531,673 B2
(45) Date of Patent: Mar. 11, 2003

(54) APPARATUS TO CONTROL OUTPUT OF A WELDING MACHINE

(76) Inventor: Michael R. Fedorcak, 4130 Arlington Ave., Fort Wayne, IN (US) 46807

( * ) Notice: Subject to any disclaimer, the term of this patent is extended or adjusted under 35 U.S.C. 154(b) by 0 days.

(21) Appl. No.: 09/827,598

(22) Filed: Apr. 9, 2001

(65) Prior Publication Data

US 2002/0144979 A1 Oct. 10, 2002

(51) Int. Cl.$^7$ ................................................ B23K 9/10
(52) U.S. Cl. ........................................ 219/74; 219/132
(58) Field of Search ........................ 219/74, 130.1, 219/130.5, 132, 136, 147; 266/48; 74/561; 228/219

(56) References Cited

U.S. PATENT DOCUMENTS

| | | | | | |
|---|---|---|---|---|---|
| 3,096,430 A | * | 7/1963 | Farr | ............................. | 219/147 |
| 3,301,996 A | * | 1/1967 | Bidwell | ..................... | 219/130.1 |
| 3,578,939 A | * | 5/1971 | Green | ........................... | 219/74 |
| 3,609,291 A | * | 9/1971 | Pilia et al. | ................... | 219/132 |
| 3,811,027 A | * | 5/1974 | Strahan | ......................... | 219/74 |
| 4,410,789 A | * | 10/1983 | Story | ........................... | 219/132 |
| 5,535,642 A | * | 7/1996 | Moll | .............................. | 74/561 |
| 5,793,016 A | * | 8/1998 | Colling et al. | ............... | 219/132 |

* cited by examiner

Primary Examiner—Clifford C. Shaw

(57) ABSTRACT

The mechanism which is the subject of this patent application is centered on a control device adapted to facilitate the control and regulation of the electrical current or the gaseous intake and mixture for a welding machine, thereby regulating the output of the welding machine, such mechanism including a foot-operated pedal member, which, in turn, is mechanically linked to electro-mechanical means activated by radio transmission means to regulate such electrical current input or the gaseous output.

1 Claim, 3 Drawing Sheets

APPARATUS TO CONTROL OUTPUT OF A WELDING MACHINE

DISCUSSION OF PRIOR ART AND BACKGROUND OF THE INVENTION

The subject invention is a control mechanism for regulating the input flow of gases used in welding processes in a welding machine. In this respect, this intake volume and ultimate burning of such gases causes the burning temperature at the welding torch to increase or decrease as needed in the welding process. In electric arc welding, gases may be used solely for shielding or other supplementary purposes. Irrespective of the role of the gases used in the welding process, the subject invention is conceived as a control mechanism that ultimately makes the welding process more efficient for the operator.

Such gas flow control devices are known in the art, however, the known devices, as presently used in the art, generally require manual manipulation of control devices that make it difficult and inefficient for use by the welder under such circumstances. More specifically, in welding operations, the welder requires relative freedom of the use of his hands for numerous tasks in the welding process, including handling the welding torch, and elimination of one of those manual tasks will improve efficiency of the process.

Thus, while there are devices known in the art that are used to help efficiently control the output of welding machines, these devices are not practical in view of the fact that use of hand controls to regulate the gaseous input are cumbersome and interfere with the necessary careful manual handling of the welding torch. If the welder is better able to handle the welding torch without the necessity of additional manipulations for the process of regulating gas flow, with greater efficiency as a result.

It is also to be noted that the subject invention may be used to regulate amperage and current flow in welding operations.

In this respect, there are no known devices in the existing art that are structured as an efficient and effective alternative means to control the current output and gas output necessary or otherwise used in welding operations. The few such devices that exist in the art are cumbersome in structural application and use, and thus not effective for the purposes intended. As a result, the subject invention is conceived as a structural means using electronic and wireless transmission means to improve on such art based upon the following objectives.

OBJECTS

It is an object of the subject invention to provide an improved control mechanism for a welding machine;

Another object of the subject invention is to provide an improved device for regulating the amperage and current flow used in welding operations;

Yet another object of the subject invention is to provide an improved welding apparatus;

Still another object of the subject invention is to provide an improved device for rendering welding operations more efficient;

An additional object of the subject invention is to provide an apparatus to help free the hands or feet of a welder to concentrate on his or her manual efforts in the handling of the welding torch;

A further object of the subject invention is to improve the efficiency of operating a welding machine;

Another object of the subject invention is to provide an improved device to control the output flow of gases or the current flow in the welding process;

An additional object of the subject invention is to provide an improved method of regulating the output of any type of gas used in a welding process;

Other and further objects of the subject invention will become apparent from a reading of the following description in conjunction with the claims and drawings.

IN THE DRAWINGS

DESCRIPTION OF GENERAL EMBODIMENT AND SUMMARY OF INVENTION

Figure 1:
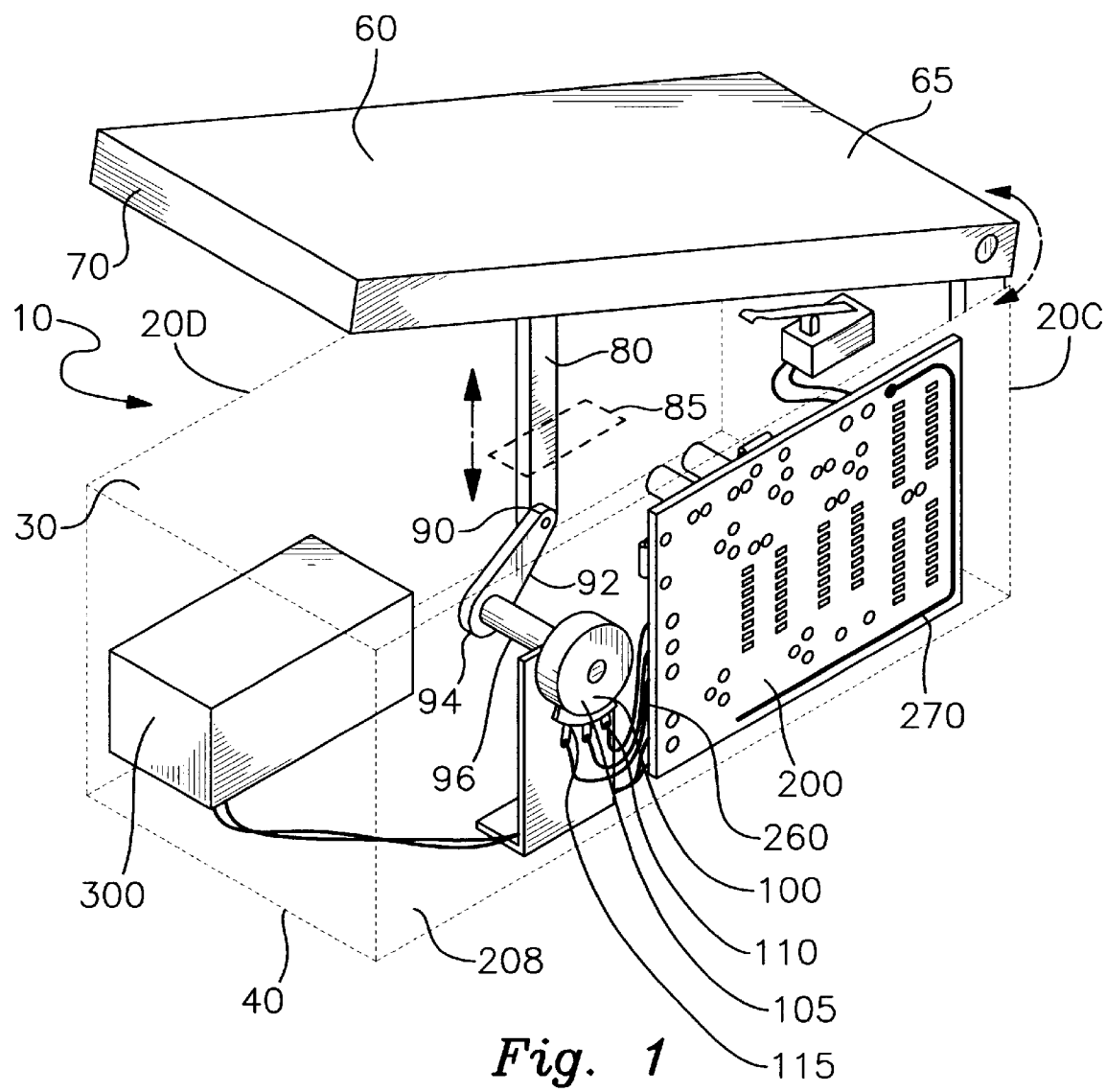
FIG. 1 is a perspective expanded view of the apparatus embodying the subject invention.

The mechanism which is the subject of this invention is centered on a control device adapted to facilitate the control and regulation of the electrical current or the gaseous intake and mixture for a welding machine, thereby regulating the output of the welding machine, such mechanism including a foot-operated pedal member, which, in turn, is mechanically linked to electro-mechanical means activated by radio transmission means to regulate such electrical current input or the gaseous output.

In summary, the subject invention is a control mechanism for regulating the intake and flow of gases used in the operation of a welding machine irrespective of the type of gases used in the process and irrespective of what function the gases are used for in the welding process. Such mechanism is focused on a foot-controlled pedal-like member that upon activation by foot pressure, controls the actions of an electromechanical apparatus that, in turn, controls the amperage and current flow in the welding process, or alternately, controls gaseous output of gases used in the welding process.

The electrical mechanical mechanism is controlled by electric or electronic means through a radio transmitting device or other means to manipulate the gas valve mechanism of a gas container, thereby regulating the gaseous output for the welding machine for welding operations, or alternately, regulateing electric current flow.

In further summary, the invention centers on a control mechanism for regulating the intake and flow of gases used for any purpose for the operation of a welding machine, such mechanism being focused on a foot-controlled pedal-like member that upon activation by foot pressure controls the actions of an electromechanical apparatus that in turn controls the current used or gaseous flow input to the welding torch in the welding process. The electrical or electronic means operate through a radio transmitting device or other electrical means to impart signals to an electromechanical control mechanism adopted to regulate the volume flow of individual gases used in the welding processs to the welding torch. The amount of current or gaseous flow of the individual gases to the welding gases controls the temperature and other welding aspects at the welding torch.

DESCRIPTION OF PREFERRED EMBODIMENT

In describing the subject invention, description is provided as to one preferred embodiment. Such a description as limited to one embodiment shall not be considered as limiting the scope of the subject invention as set forth in the claims appended hereto. Additionally, it is to be noted that the invention concepts herein can apply equally to the control of current flow used in the welding process as well as to the control of gases used in the welding process.

As a background to describing the preferred embodiment of the subject invention, it is to be noted that welding is a process whereby two or more pieces of metal are merged or joined together into one piece. In this welding process the metallic surfaces of pieces to be joined are required to be placed in close contact with each other in order for the atoms of one metal surface to intermingle with the atoms of the other metallic surface. Moreover, during the welding process, a compound referred to as flux is used to dissolve any scale or oxides that have collected on the metal surface during the welding process.

Most welding processes used today are fusion welding processes. as opposed to pressure welding. Fusion welding includes an electric arc welding, oxyacetylene welding and thermite welding. Electric arc welding is a high temperature welding process at temperatures in the order of 7500 degrees Fahrenheit or above. This process uses an electric current in the process. Another fusion welding process is the termite welding process which involves reaction between aluminum and iron. Oxyacetylene welding is another form of fusion welding primarily using oxygen gas and acetyle gas, each gas emanating from separate containers to be intermixed at the welding torch to provide a relatively high temperature. Another form of fusion welding is the oxy-hydrogen welding process which uses proportional amounts of oxygen and hydrogen gases drawn from separate containers which use atomic oxygen in conjunction with atomic hydrogen for welding and oxygen separately for cutting. This process is capable of yielding very high welding temperatures. In the latter process, it is important that the proportions of oxygen and hydrogen be closely regulated because excesses of each gas can disrupt the welding process.

It is again stressed that while the subject invention is generally applicable to electric arc welding processes, as set forth herein, it is also applicable to the other variant welding processes described above.

Referring now to the drawings in which a preferred embodiment of the subject invention is shown, and specifically referring to FIG. 1 of the drawings, FIG. 1 shows a control unit 10 which incorporates features of the subject invention. This control unit 10 is preferably structured as a self-contained assembly functioning solely as an integrated unit to provide control means to regulate the flow of gases in the particular welding processes used. As seen, the self-contained unit 10 is shown basically having a box-like housing with rectangularly configured externally disposed side walls 20A, 20B, 20C and 20D and a rectangularly shaped upper surface 30 and lower surface 40. It is to be noted in this regard that the external housing may have any number of configurations other than the described box-like shape just described.

As can be seen from the drawings, the housing member 10 is adapted to be rested with its bottom surface on the floor near the welding apparatus to be used as described below. The control box is comprised generally of a foot-activated pedal member 60 which is disposed on the upper, outer portion of the control unit 10, a potentiometer 100, which is lever actuated by movement of the foot pedal, a transmitter 200 board controlled by the foot pedal, and a power source in the form of a battery 300 or other appropriate power source. Each of these elements are discussed hereafter.

Attention is again addressed to FIGS. 1 and 2 of the drawings. As seen in FIG. 1, the foot pedal member is positioned on the upper surface of the housing member. More particularly, foot pedal 60 has a first end 65 and a second end 70. The first end 65 of the foot pedal is pivotably mounted to a portion of the upper surface 30 of the housing member, as seen. The second end 70 of the foot pedal is raised upwardly above the upper surface 30 of the housing member to be depressed by a downward movement of the operator's foot. Integrally disposed on the undersurface of the foot pedal 60 is a downwardly depending. pedal rod member 80.

As can be observed in FIG. 1, the upper surface 30 of the housing member has an opening 85 extending from the upper surface to the lower surface thereof. The downwardly depending pedal rod member 80 extends downwardly through such opening 85. Rod member 80 is interconnected on its lower end to the first end 90 of lever member 92. The second end 94 of lever member 92 is integrally attached to a perpendicularly extending potentiometer control bar 96, as shown. As seen in FIG. 1, the potentiometer control bar 96 is interconnected to the potentionmeter 100 to control the output of the potentiometer.

More specifically, the movable control.element 105 on the potentiometer 100, sometimes referred to as a slider, is structured to rotate back and forth on a guide mechanism 110 and makes electrical contact on a portion thereof with a resistor 115 and the point of contact will vary along the length of the resistor as the control element 105 rotates back and forth along the resistor 115. As the control element 105 moves along the resistor 115, the voltage output from such potentiometer will be varied between zero and the desired amount of the voltage input, such output thus being an inverse function of the amount of resistance in this positioning of the control bar 96 for the potentiometer 100 as determined by the exact point of positioning on the control element along the resistor, thereby governing the voltage output of the potentiometer.

Figure 3A:
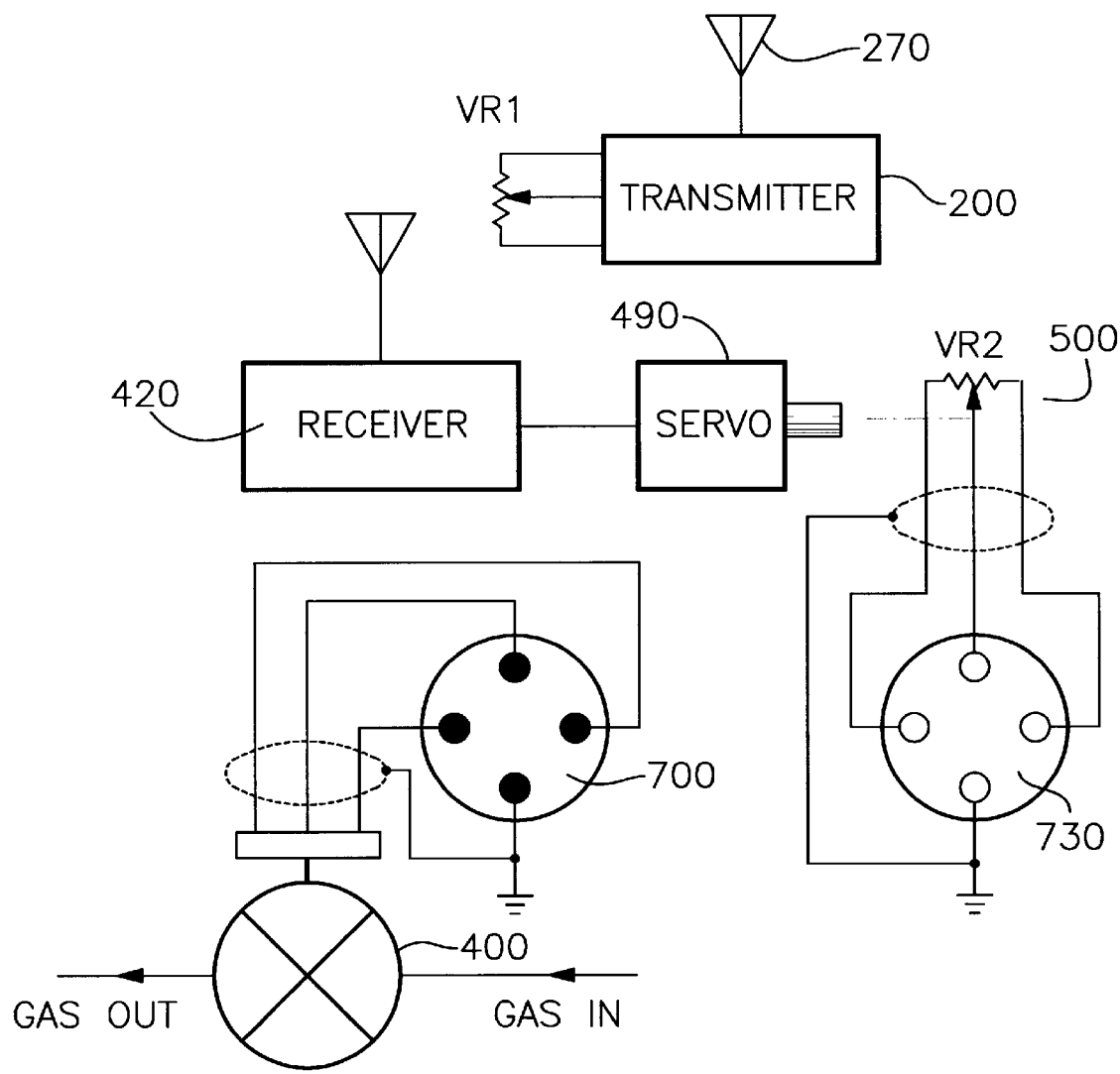
FIG. 3A is a schematic view of components of the subject invention illustrating their operational relationship.

The voltage output generated through the potentiometer circuit is the determining factor of the amount of welding gases to be drawn from individual gas containers, controlled by a gas valve, such as gas valve 400 shown schematically in FIG. 3. This voltage output is to be transmitted through electronic radio means or by direct electric lead lines to a radio receiver 420, as shown in FIG. 3 to control the electrical current output that controls the operation and output of the gas container valve 400. This controls the amount of shielding gas or other gas to be transferred to the welding region of the welding torch. For this purpose, the following described method is preferred to minimize the inconvenience of electrical wires.

The voltage output at potentiometer circuit 260 is fed to transmitter 200, as discussed above, and this transmitter, in turn, is adapted to receive the input of Vo from the potentiometer 100 and transmit electronic signals of variable strength through transmitter antenna 270 depending on the amount of the voltage output Vo. This signal is thus relayed to radio receiver 420 juxtaposed in the vicinity of gas valve 400 which, in turn, transmits radio signals so received to servo member 490. The servo member 490 mechanically transfers signals, enhanced by electrical current through the servo circuit 500 to open and close gas valve 400 to the degree needed by the welder.

The servo electrical circuit comprises a battery or power supply connected in the circuit for each received along with the servo member 490 that is controlled by the electrical current flowing through the circuit, which current flow will be activated by the receiver signal. The servo output action will be proportional to the radio signal received, as stated, and it will cause the gas valve 400 interconnected to such servo 490 to close and open the valve member gradually as signalled.

Figure 2:
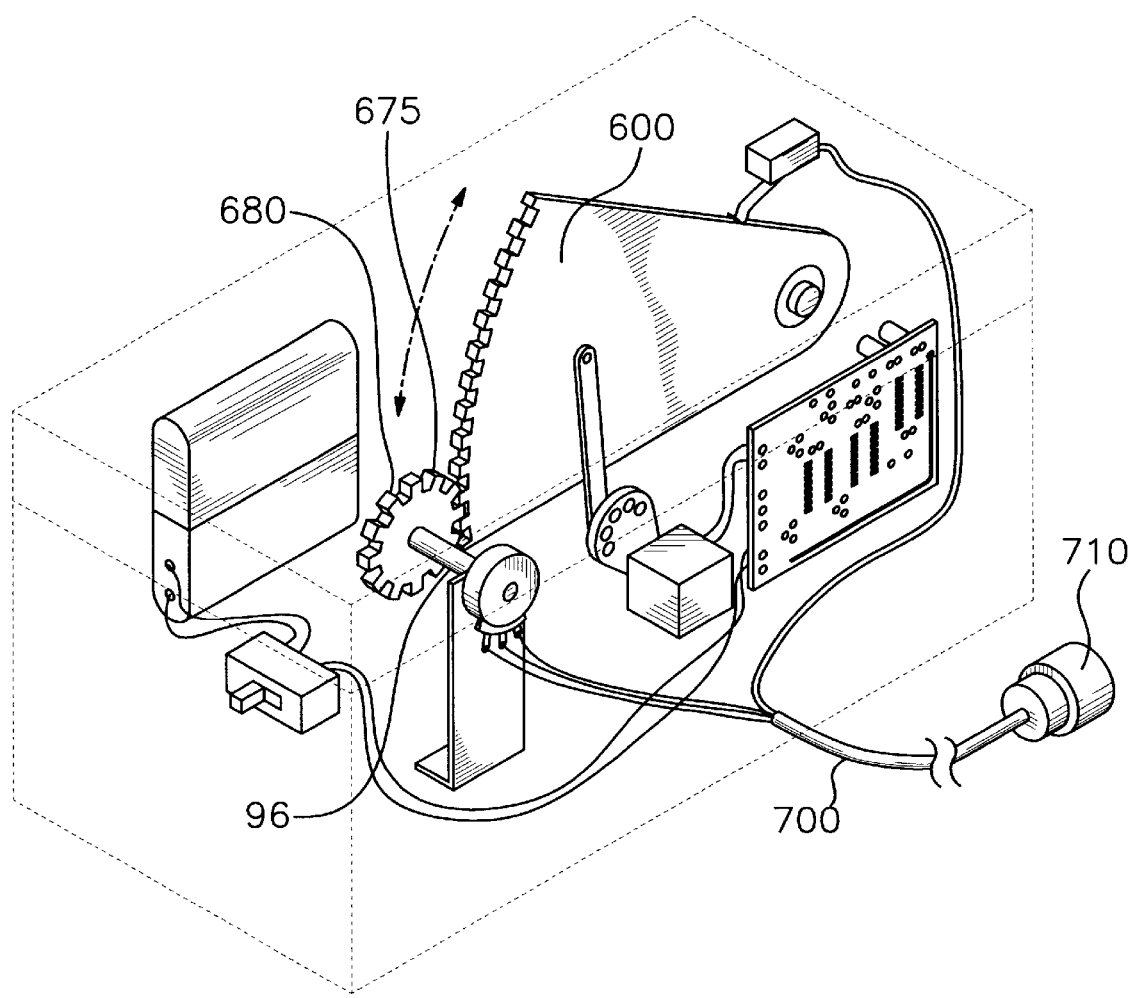
FIG. 2 is a perspective view of an alternate embodiment of the subject invention.

Shown in FIG. 2 is an alternate embodiment of the concept herein for electric transmission of the signal to activate valve member on the gas tank. Specifically, the pedal member 60 in the embodiment shown in FIG. 2 is integrally connected to a downwardly extending ratchet arm 600 having gear teeth 670 on the distal end thereof away from the pedal pivot point, which ratchet arm member is adapted to engage the gear teeth 675 on gear 680. Gear 680 directly turns the potentiometer arm 96 to activate the potentiometer 100. Additionally, shown in FIG. 2 is a direct electrical lead 700, which leads to electrical circuit plug 710 for an alternate electrically wired connector through female connector 720 to activate the electrical signal transmission process activation of the gas valve members. This alternate approach can serve as a standby or alternate means to transmit the signal for activation of the gas valves.

What is claimed is:

1. A device to remotely control the output of gases from gas containers for a welder, as activated by a person's foot movement, comprising:
    (a) a base member, such base member having affixed thereto
        (i) a foot activated pedal member for activating the control of the output of gases; (ii) electromechanical member connected to said foot activated pedal member; (iii) electronic means connected to said electromechanical member to convert mechanical to electrical energy; (iv) radio transmitter means connected to said electronic means to transmit radio signals;
    (b) radio receiver means affixed to one or more of said gas containers, said radio receiver means adapted to receive said radio signals from said radio transmitter means;
    (c) electromechanical means on said gas containers to activate valves on said gas containers to open same respective to said radio signals in said radio receiver means.

* * * * *